US010423804B2

(12) United States Patent
Benson et al.

(10) Patent No.: US 10,423,804 B2
(45) Date of Patent: Sep. 24, 2019

(54) CRYPTOGRAPHIC SEPARATION OF USERS

(71) Applicant: Apple Inc., Cupertino, CA (US)

(72) Inventors: Wade Benson, San Jose, CA (US);
Conrad Sauerwald, Mountain View, CA (US); Mitchell D. Adler, Los Gatos, CA (US); Michael Brouwer, Los Gatos, CA (US); Timothee Geoghegan, San Francisco, CA (US); Andrew R. Whalley, San Francisco, CA (US); David P. Finkelstein, Sunnyvale, CA (US); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 362 days.

(21) Appl. No.: 15/275,273

(22) Filed: Sep. 23, 2016

(65) Prior Publication Data

US 2017/0357830 A1  Dec. 14, 2017

Related U.S. Application Data

(60) Provisional application No. 62/349,049, filed on Jun. 12, 2016.

(51) Int. Cl.
*G06F 21/72* (2013.01)
*H04L 9/08* (2006.01)
*H04L 9/14* (2006.01)
*G06F 21/32* (2013.01)

(52) U.S. Cl.
CPC .............. *G06F 21/72* (2013.01); *G06F 21/32* (2013.01); *H04L 9/0822* (2013.01); *H04L 9/14* (2013.01); *G06F 2212/1052* (2013.01); *G06F 2212/402* (2013.01)

(58) Field of Classification Search
CPC .......... G06F 21/32; G06F 21/72; G06F 21/24; G06F 12/14; H04L 9/0822; H04L 9/14; H04L 9/32
USPC .......................... 713/165, 150, 193; 380/259
See application file for complete search history.

(56) References Cited

U.S. PATENT DOCUMENTS 6,901,499 B2 *  5/2005  Aasheim ............. G06F 12/0246
                                                    711/205
8,510,552 B2     8/2013  De Atley et al.
2006/0021066 A1 *  1/2006  Clayton ................ H04L 9/0822
                                                    726/28

(Continued)

*Primary Examiner* — Thanhnga B Truong
(74) *Attorney, Agent, or Firm* — Meyertons, Hood, Kivlin, Kowert & Goetzel, P.C.

(57) ABSTRACT

Techniques are disclosed relating to securely storing data in a computing device. In one embodiment, a computing device includes a secure circuit configured to maintain key bags for a plurality of users, each associated with a respective one of the plurality of users and including a first set of keys usable to decrypt a second set of encrypted keys for decrypting data associated with the respective user. The secure circuit is configured to receive an indication that an encrypted file of a first of the plurality of users is to be accessed and use a key in a key bag associated with the first user to decrypt an encrypted key of the second set of encrypted keys. The secure circuit is further configured to convey the decrypted key to a memory controller configured to decrypt the encrypted file upon retrieval from a memory.

19 Claims, 11 Drawing Sheets

(56) References Cited

U.S. PATENT DOCUMENTS

| | | | |
|---|---|---|---|
| 2007/0195957 A1* | 8/2007 | Arulambalam | G06F 21/72 380/277 |
| 2007/0297608 A1* | 12/2007 | Jonas | H04L 9/0822 380/259 |
| 2010/0077201 A1* | 3/2010 | Asano | H04L 9/0822 713/150 |
| 2011/0252234 A1* | 10/2011 | De Atley | H04L 9/0891 713/165 |
| 2014/0089617 A1* | 3/2014 | Polzin | G06F 12/14 711/163 |
| 2018/0173645 A1* | 6/2018 | Parker | G06F 12/14 |

* cited by examiner

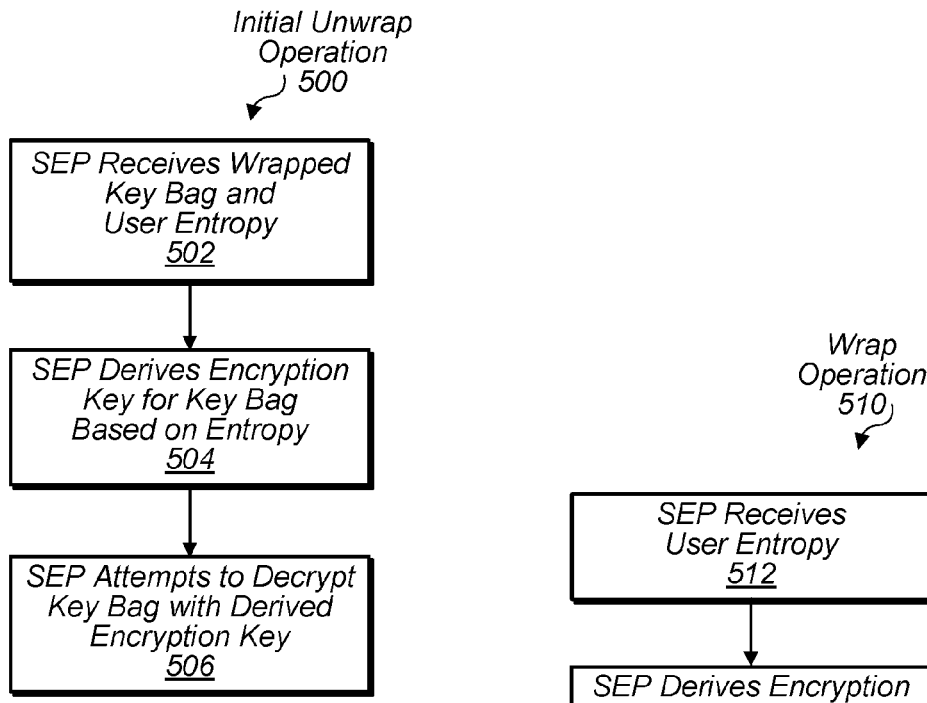
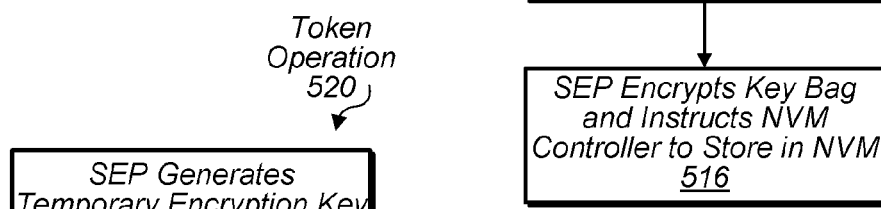
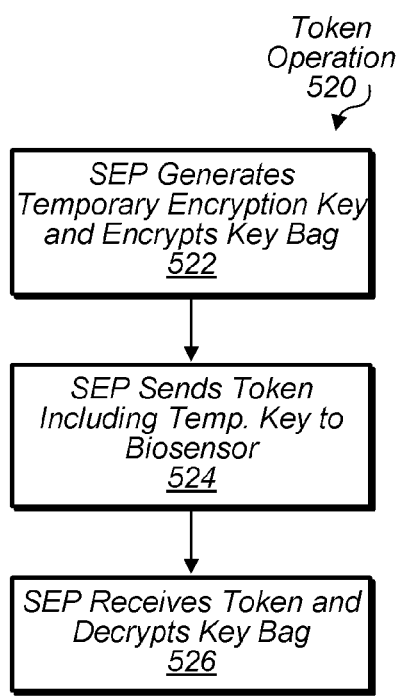
FIG. 5A
FIG. 5B
FIG. 5C

CRYPTOGRAPHIC SEPARATION OF USERS

This application claims the benefit of U.S. Prov. Appl. No. 62/349,049 filed on Jun. 12, 2016, which is incorporated by reference herein in its entirety.

BACKGROUND

Technical Field

This disclosure relates generally to computing devices, and, more specifically, to computing devices that support secure data storage.

Description of the Related Art

Computing devices can typically maintain large amounts of personal information, which could potentially be acquired by some malicious person. For example, a user's mobile phone might store contact information of friends and family, photographs, text messages, email, etc. In some instances, a computing device may attempt to prevent access to this information by presenting a login screen that requires a user to provide a user name and password in order to obtain access to data stored therein. Accordingly, if a malicious person is unable to provide this information, this person may not be able to gain access. That being said, it may still be possible to gain access to data by some other means if the data is stored in an unencrypted manner and the malicious person is able to extract the data directly from the memory. For this reason, other computing devices may attempt to encrypt the contents memory.

SUMMARY

The present disclosure describes embodiments in which a computing device implements cryptographic isolation to protect data associated with different users. In various embodiments, the computing device includes a secure circuit that is configured to maintain key bags associated with different respective users such that each key bag includes encryption keys usable to access data associated with that respective user. In such an embodiment, each key bag may be wrapped (i.e., encrypted) with an encryption key derived from entropy supplied by the key bag's owner in order to prevent one user from accessing another user's key bag contents. When access to a user's data is warranted, the secure circuit may unwrap that user's key bag in order to obtain the encryption keys usable to access that user's data.

To gain access to a user's data, in some embodiments, the secure circuit uses keys in a user's key bag to decrypt another set of keys that are stored with the data and used to encrypt the data. In some embodiments, when a user wishes to access a particular file, for example, the secure circuit may decrypt the encryption key associated with that file and provide the key to a memory controller that is configured to decrypt the file when retrieving it from memory.

BRIEF DESCRIPTION OF THE DRAWINGS

FIG. 5A-5C are flow diagrams illustrating examples of unwrap and wrap operations for a key bag.

Figure 1:
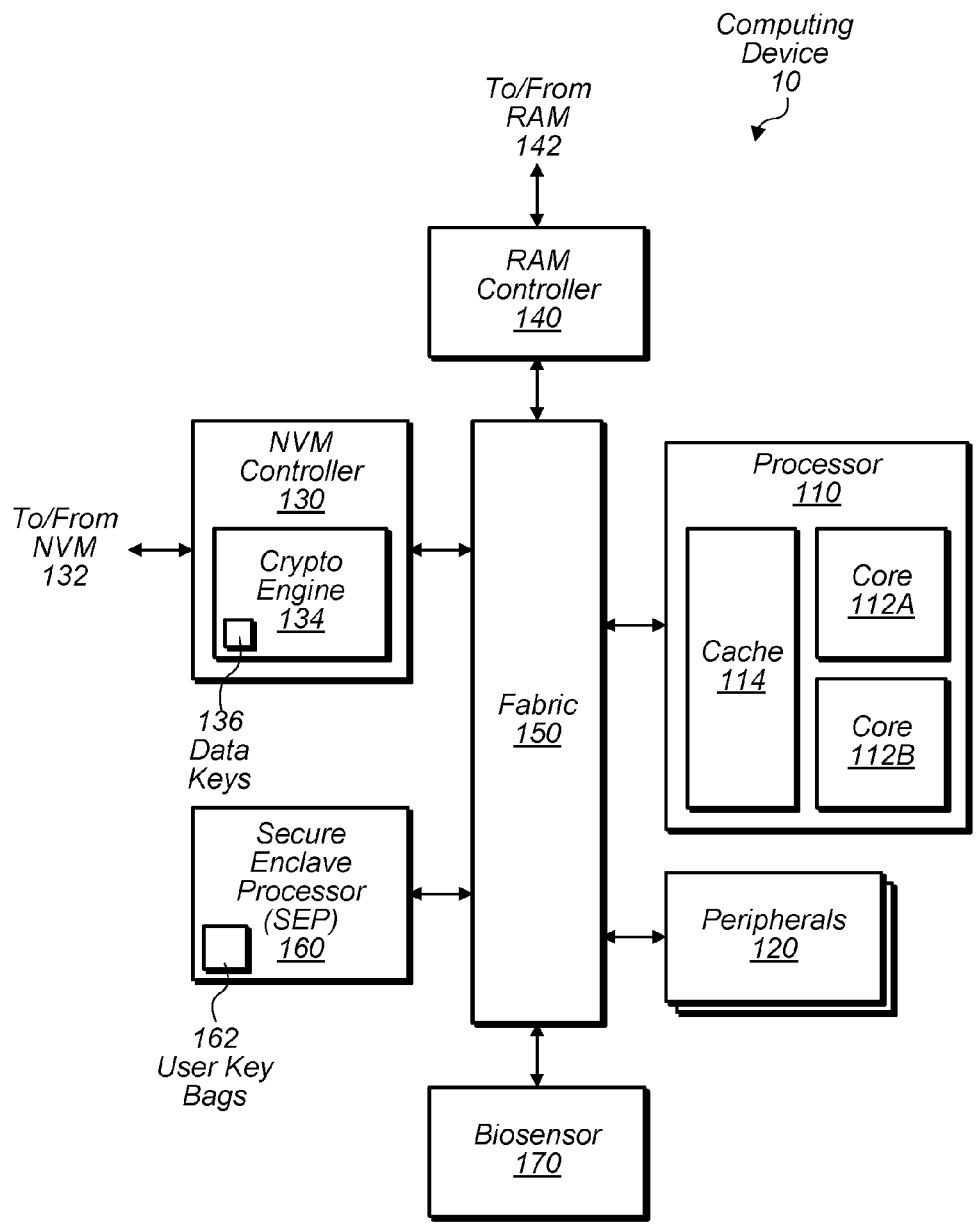
FIG. 1 is a block diagram illustrating an example of a computing device configured to implement cryptographic isolation of user data.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform a cryptographic operation" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to physical processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Encrypting the contents of memory in a computing device may be useful in preventing an unauthorized person from accessing the contents. A problem may arise, however, when multiple people are authorized to use a device, but have their own data, which they wish to keep confidential. For example, a computing device may encrypt the contents of a drive using a single encryption key that becomes available when a user successfully logs into the device. Once this key becomes available, however, the device may not be able to prevent that user from using this key to access the data of another user.

Accordingly, the present disclosure embodiments in which a computing device is configured to store information for multiple users in a manner that cryptographically isolates one user's data from another's data. As used herein, the phrase "cryptographic isolation" refers generally to isolating one user's data from another by encrypting a user's data with one or more encryption keys that are not accessible to other users—thus, preventing the other users from accessing the data. As will be described in greater detail below, in various embodiments, the computing device includes a secure circuit (referred to below as a secure enclave processor (SEP)) configured to maintain collections of encryption keys (referred to as key bags) for each user of the computing device that are usable by a user to gain access to his or her data. In various embodiments, the SEP wraps a user's key bag (i.e., encrypts the user's key bag) with a master key that is derived with a credential supplied by that user—thus preventing one user from accessing another user's key bag without knowing the other user's credential. If a user later attempts to access the computing device, the user may supply the credential to the SEP, which derives the master key and unwraps the key bag for that user.

In some embodiments, keys in a user's key bag do not directly encrypt a user's data; rather, the keys encrypt another set of data keys, which are used to encrypt the data and are stored with the encrypted data. For example, in some embodiments discussed below, each file of a user is encrypted with a respective file key stored with the file. In such an embodiment, when a user attempts to access a file, the SEP is configured to decrypt the corresponding file key with one of the keys in the user's key bag. The decrypted file key may then be used to decrypt the file. In some embodiments, file decryption may be separately handled by the memory controller that reads the file from memory as discussed below. Although various examples are given below pertaining to file manipulation, data keys may be used to encrypt user data having a level of granularity different than a file in other embodiments such as a portion of a file (i.e., file extent), a block of multiple files, a directory, etc. In other embodiments, user data may also be encrypted by the keys in a user's key bag. Accordingly, the phrase "using an encryption key to decrypt data" is used herein to refer to either 1) decrypting data with that encryption key or 2) decrypting another encryption key with the encryption key and decrypting the data with the other key.

Turning now to FIG. 1, a block diagram of a computing device 10 configured to implement cryptographic isolation of user data is depicted. Computing device 10 may correspond to any suitable computer system. Accordingly, in some embodiments, device 10 may be a mobile device (e.g., a mobile phone, a tablet, personal data assistant (PDA), laptop, etc.), desktop computer system, server system, network device (e.g., router, gateway, etc.), microcontroller, etc. In the illustrated embodiment, computing device 10 includes a processor 110, one or more peripherals 120, a non-volatile memory (NVM) controller 130, random access memory (RAM) controller 140, fabric 150, secure enclave processor (SEP) 160, and biosensor 170. As shown, processor 110 may include multiple cores 112 and a cache 114. NVM controller 130 may include a cryptographic engine 134. Although not shown, in some embodiments, computing device 10 may include more (or less components) such as NVM 132 and RAM 142. In some embodiments, computing device 10 (or components within computing device 10) may be implemented as a system on a chip (SOC) configuration.

Processor 110, in one embodiment, is configured to execute various software that access data stored in NVM 132 and RAM 142 such as an operating system and one or more user applications. In various embodiments, processor 110 is a central processing unit (CPU) for computing device 10. Accordingly, processor 110 may include circuitry configured to execute instructions defined in an instruction set architecture implemented by the processor. As noted above, processor 110 may include multiple processor cores 112A and 112B to support concurrent execution of program instructions. Cores 112 may also be multithreaded and operate on data stored in cache 114, which may correspond to an L2 cache.

Peripherals 120, in one embodiment, are other forms of hardware that are configured to operate on data stored in NVM 132 and RAM 142 and may perform input and/or output operations for computing device 10. For example, in one embodiment, peripherals 120 include a touch screen configured to display frames generated by computing device 10 as well as receive user touch inputs. Peripherals 120 may include a keyboard configured to receive key presses from a user and convey that information to processor 110. Peripherals 120 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 120 may include audio peripherals such as microphones, speakers, interfaces to microphones and speakers, audio processors, digital signal processors, mixers, etc. Peripherals 120 may include interface controllers for various interfaces external to computing device 10 including interfaces such as Universal Serial Bus (USB), peripheral component interconnect (PCI) including PCI Express (PCIe), serial and parallel ports, etc. Peripherals 120 may include networking peripherals such as media access controllers (MAC s).

NVM controller 130, in one embodiment, is configured to facilitate accessing data stored in NVM 132, which may include various user data and system files. Controller 130 may generally include circuitry for receiving requests for memory operations from the other components of computing device 10 and for accessing NVM 132 to service those requests. Accordingly, controller 130 may include circuitry for issuing read and write commands to NVM 132, performing logical-to-physical mapping for data in NVM 132, etc. In some embodiments, controller 130 includes circuitry configured to handle various physical interfacing (PHY) functionality to drive signals to NVM 132. In some embodiments, NVM 132 may include various forms of solid-state memory such as NAND flash memory, NOR flash memory, nano RAM (NRAM), magneto-resistive RAM (MRAM), phase change RAM (PRAM), etc. In various embodiments, controller 130 is configured to send data read from NVM 132 over fabric 150 to various components of computing device 10 such as RAM controller 140. In such an embodiment, controller 130 may be configured to implement a direct memory access (DMA) controller that coordinates DMA transactions to exchange information associated with read and write operations over fabric 150 to components 110-170.

RAM controller 140, in one embodiment, is configured to facilitate reading and writing data to RAM 142, which may allow data to be more quickly accessed than NVM 132. Similar to NVM controller 130, RAM controller 140 may generally include circuitry for servicing data requests associated with RAM 142. Accordingly, controller 140 may include circuitry configured to perform virtual-to-physical address mapping, generate refresh instructions, perform row address strobes (RAS) or column address strobes (CAS), etc. Controller 140 may also include PHY circuitry for handling the physical interfacing with RAM 142 such as receiving and transmitting data, data-strobe, CAS, and RAS signals. In some embodiments, memory 142 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.).

Communication fabric 150 may be any communication interconnect for communicating among the components of computing device 10. Fabric 150 may be bus-based, including shared bus configurations, cross bar configurations, and hierarchical buses with bridges. Fabric 150 may also be packet-based, and may be hierarchical with bridges, cross bar, point-to-point, or other interconnects.

As noted above, in various embodiments, computing device 10 is configured to implement cryptographic isolation for user data stored in NVM 132 in order to prevent one authorized user from accessing data of another authorized user. In doing so, data on NVM 132 may also prevent malicious software running on processor 110 from accessing user data as well as malicious attacks via peripherals 120. As will be discussed below, in various embodiments, computing device 10 implements cryptographic isolation via cryptographic engine 134, SEP 160, and/or biosensor 170.

Cryptographic engine 134, in one embodiment, is circuitry configured to encrypt data being written to NVM 132 by NVM controller 130 and decrypt data being read from NVM 132 by controller 130. Cryptographic engine 134 may implement any suitable encryption algorithm such as Data Encryption Standard (DES), Advanced Encryption Standard (AES), Rivest Shamir Adleman (RSA), Elliptic Curve Cryptography (ECC), etc. In the illustrated embodiment, engine 134 is configured to encrypt and decrypt data with data keys 136. As will be described below with FIGS. 2A and 2B, a given file of a user (or a data block of some other granularity) may be encrypted with a data key 136 that is also stored with the encrypted file. Data keys 136 for files of a particular user are, in turn, encrypted by keys in that user's key bag 162. By encrypting each data key 136 in this manner, a person is prevented from accessing the files of a particular user if that person does not have access to the particular user's key bag 162.

Secure enclave processor (SEP) 160 is a secure circuit configured to maintain user key bags 162 for encrypting and decrypting data keys 136. As used herein, the term "secure circuit" refers to a circuit that protects an isolated, internal resource from being directly accessed by an external circuit such as processor 110 and peripherals 120. This internal resource may be memory that stores sensitive data such as user key bags 162. This internal resource may also be circuitry that performs services/operations associated with sensitive data such as cryptographic circuitry configured to perform encryption and decryption with key bags 162. As will be described below with FIGS. 3A-4B, in various embodiments, SEP 160 is configured to encrypt data keys 136 with keys in key bags 162 for storage on NVM 132, and decrypt data keys 136 when needed by engine 134 for encryption or decryption of user data. In some embodiments, SEP 160 is configured to communicate keys 136 with engine 134 over a secure connection established using a shared key known only to SEP 160 and engine 134. As will be described with FIGS. 5A-5D, in various embodiments, SEP 160 is configured to wrap a key bag 162 of a user with an encryption key (e.g., a "master key") derived from entropy supplied by the user (i.e., a user-supplied credential), and to store the wrapped key bag 162 in NVM 132 for long term storage. SEP 160 may later retrieve the wrapped key bag 162 and unwrap it by re-deriving the master key with a newly supplied credential from the user. By encrypting a user's key bag 162 in this manner, one user cannot access another user's key bag 162 without knowing the other user's credential. In some embodiments, SEP 160 may require that a user supply a credential to unwrap a key bag 162 only after certain events such as after a restart of device 10. In other events, such as when a user locks a screen of device 10, SEP 160 may rely on biosensor 170 to extend the use of a previously unwrapped key bag 162 (as opposed to requesting that the credential again).

Biosensor 170, in one embodiment, is configured to detect biometric data for a user of computing device 10. Biometric data may be data that uniquely identifies the user among other humans (at least to a high degree of accuracy) based on the user's physical or behavioral characteristics. For example, in some embodiments, sensor 170 is a finger print sensor that captures fingerprint data from the user. In another embodiment, sensor 170 is a camera that captures facial information from a user's face. In some embodiments, biosensor 170 may maintain previously captured biometric data of an authorized user and compare it against newly received biometric data in order to authenticate a user. (In other embodiments, SEP 160 may handle storage and comparison of biometric data.) In various embodiments, after SEP 160 initially unwraps a key bag 162, SEP 160 is configured to rewrap the key bag 162 if an event occurs, such as the user locking a screen of device 10. SEP 160 may then provide a token that includes the key used to perform the rewrapping to the biosensor 170. When the key bag 162 is later needed, SEP 160 may request the token from biosensor 170 (as opposed to asking for the user's credential again). In such an embodiment, biosensor 170 may then collect new biometric data from the user and compare it against previously stored biometric data for that user. If a match is determined, biosensor 170 may return the token enabling SEP 160 to unwrap the key bag 162.

Figure 2A:
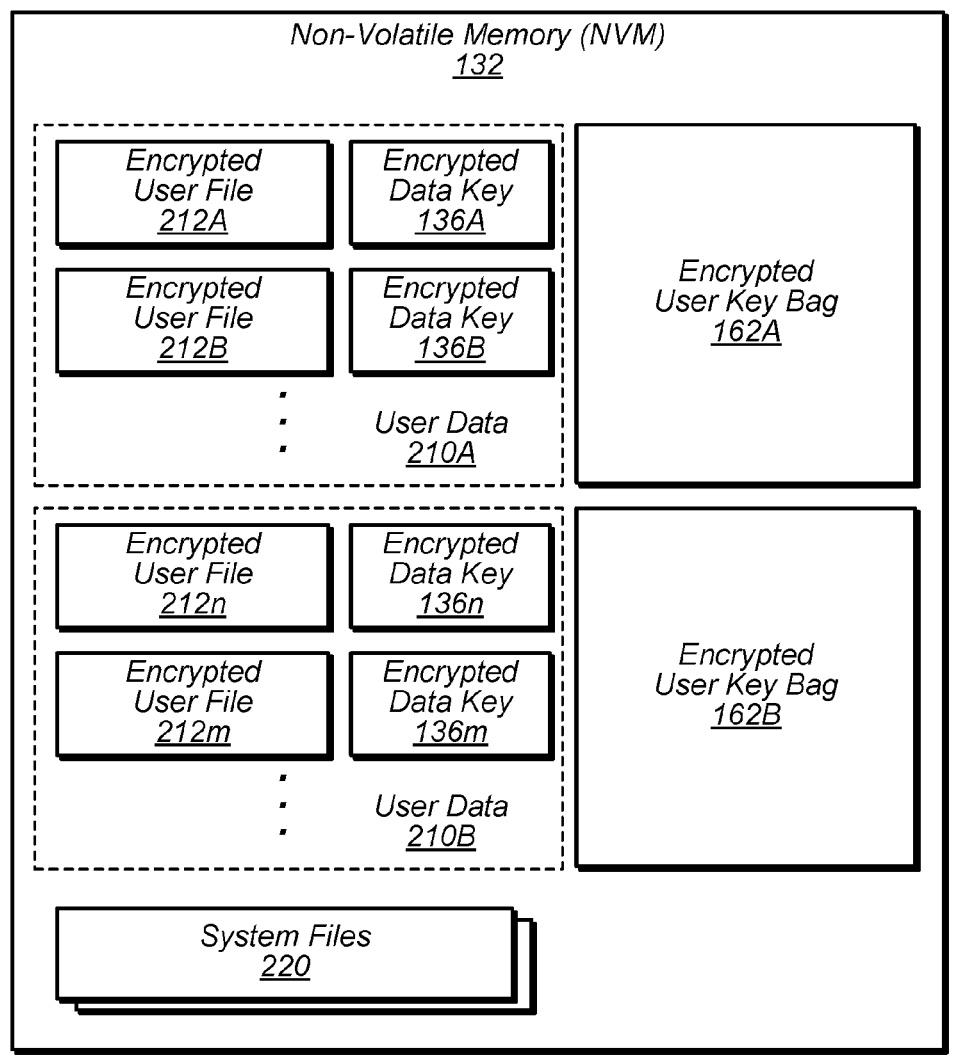
FIGS. 2A and 2B are block diagrams illustrating examples of storing encrypted data and encryption keys in a non-volatile memory.

Turning now to FIG. 2A, a block diagram of the contents of NVM 132 is depicted. As shown, NVM 132 may include sets of user data 210A and 210B, system files 220, and users key bags 162. In the illustrated embodiment, each set of user data 210 further includes user files 212 and corresponding data keys 136.

User data 210 may include of various forms of information that a user wishes to keep confidential. For example, user data 210 may include email, photos, text messages, contact information for friends and family, calendar information, documents, the contents of a user's home directory, desktop directory, device configuration information, credentials for logging into various websites and services, etc. As noted above, in various embodiments, user data 210 for different users is stored in NVM 132 in a cryptographically isolated manner. Accordingly, in the illustrated embodiment, the user corresponding to user data 210A cannot access user data 210B belonging to another user.

In the illustrated embodiment, each user file 212 is encrypted with a respective one of data keys 136. Accordingly, user file 212A is encrypted with data key 136A, user file 212B is encrypted with data key 136B, and so forth in order to prevent those files from being accessible without decryption. As noted above, in other embodiments, each data key 136 may correspond to a data block having a different granularity than a file. Accordingly, in some embodiments, a file may comprise multiple file extents distributed across NVM 132. In such an embodiment, each extent may be encrypted with a respective key 136 that is stored with that file extent.

In various embodiments, each data key 136 associated with a particular set of user data 210, in turn, is encrypted with a key in the key bag corresponding to the owner of that user data 210. Accordingly, data keys 136A and 136B may be encrypted by one or more keys in key bag 162A, data keys 136n and 136m may be encrypted by user key bag 162B, and so forth. As will be described below with FIG. 2B, in some embodiments, the particular key used in a given key bag 162 may be selected based on the classification of data in the file 212 being decrypted. As shown, each key bag 162 is also encrypted in NVM 132 as discussed above.

In the illustrated embodiment, system files 220 are not encrypted by a corresponding set of data keys 136. In other embodiments, however, files 220 may be encrypted. In one such embodiment, data keys for system files 220 may be encrypted by keys in a corresponding system key bag. In another embodiment, a key used to encrypt data keys of system files 220 may be placed in each user key bag 162.

Figure 2B:
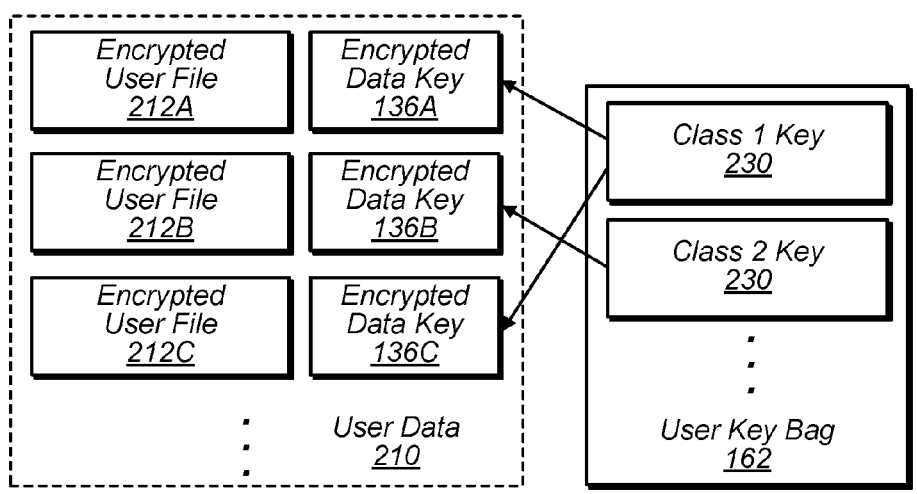

Turning now to FIG. 2B, a block diagram of class keys and their relationships to corresponding data keys is depicted. In some embodiments, a given file 212 may be assigned a classification based on the contents of that file 212 and the particular needs for accessing those contents—e.g., all email files 212 may be assigned the same classification. In such an embodiment, files 212 assigned to the same classification may have their corresponding data keys 136 encrypted by the same class key 230 in a user's key bag 162. For example, in FIG. 2B, files 212 A and 212C are assigned to class 1, and thus, their data keys 136A and 136C are encrypted by class 1 key 230. As shown, file 212B is assigned to class 2; thus, data key 136B is encrypted by class 2 key 230. In various embodiments, each data key 136 is stored with metadata identifying the classification to which that key 136 pertains and the user associated with that key 136. SEP 160 may then select the appropriate class key 230 based on this metadata.

Any suitable classification scheme may be used for files. In some embodiments, files may be placed into one of four classifications. In such an embodiment, the first class may pertain to files that remain unencrypt after a user restarts device 10 and logs into device 10 for the first time. For example, a file including a user's Wi-Fi passwords may be assigned to this class. The second class may pertain to files that are accessible only when the screen of device 10 is unlocked and accessible to the user. For example, a file including a user's photo may be assigned to this class. The third class may pertain to files that can be written to when a screen of device 10 is locked, but not read from. For example, files associated with a user's email may be assigned to this class as it may be beneficial to record email data as it is received at device 10. In some embodiments, data associated with this class may be encrypted using an asymmetric key pair. In such an embodiment, the encrypted data key 136 may be the private key of the pair while the corresponding public key may remain unencrypted after an initial login. The fourth class may pertain to files that are not encrypted such as system files 220 in some embodiments.

Figure 3A:
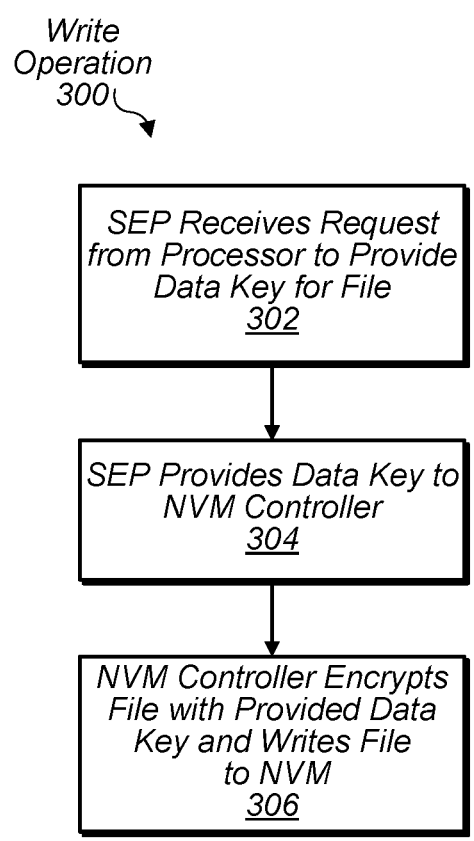
FIG. 3A is a flow diagram illustrating an example of a write operation to the non-volatile memory.

Turning now to FIG. 3A, a flow diagram of a write operation 300 is depicted. In various embodiments, computing device 10 performs operation 300 when writing a file 212 to NVM 132.

In step 302, SEP 160 receives a request from processor 110 to provide a data key 136 for a file 212 being written to NVM 132. In various embodiments, this request may come from an operating system executing on processor 110 in response to an application requesting the storage of information. In some embodiments, the request from processor 110 specifies whether SEP 160 is to generate a new data key 136 for a new file 212 or to provide an existing data key 136 for an existing file 212. If the request is for an existing key 136, the request may include the encrypted key 136 for decryption. In another embodiment, the request may specify an address where the key 136 is located in NVM 132 in order for SEP 160 to retrieve the key 136 from NVM 132.

In step 304, SEP 160 provides the requested data key 136 to NVM controller 130. If the requested key 136 already exists in NVM 132, step 304 may include SEP 160 decrypting the encrypted key 136 using a key bag 162 maintained in SEP 160. In various embodiments, SEP 160 also encrypts data key 136 with an encryption key known to NVM controller 130 prior to sending the requested data key 136. If the requested data key 136 is newly generated, step 304 may also include SEP 160 using a key bag 162 to encrypt a persisted copy of the data key 136 for storage in NVM 132 with the file 212.

In step 306, NVM controller 130 (or more specifically engine 134) encrypts the file with the provided data key 136 and writes the file to NVM 132. If controller 130 received a persisted copy of the key 136 in step 304, step 306 may also include controller 130 writing the persisted copy of the key 136 to NVM 132. In various embodiments, controller 130 may discard the provided key 136 once it has successfully encrypted the file 212 and written it to NVM 132.

Figure 3B:
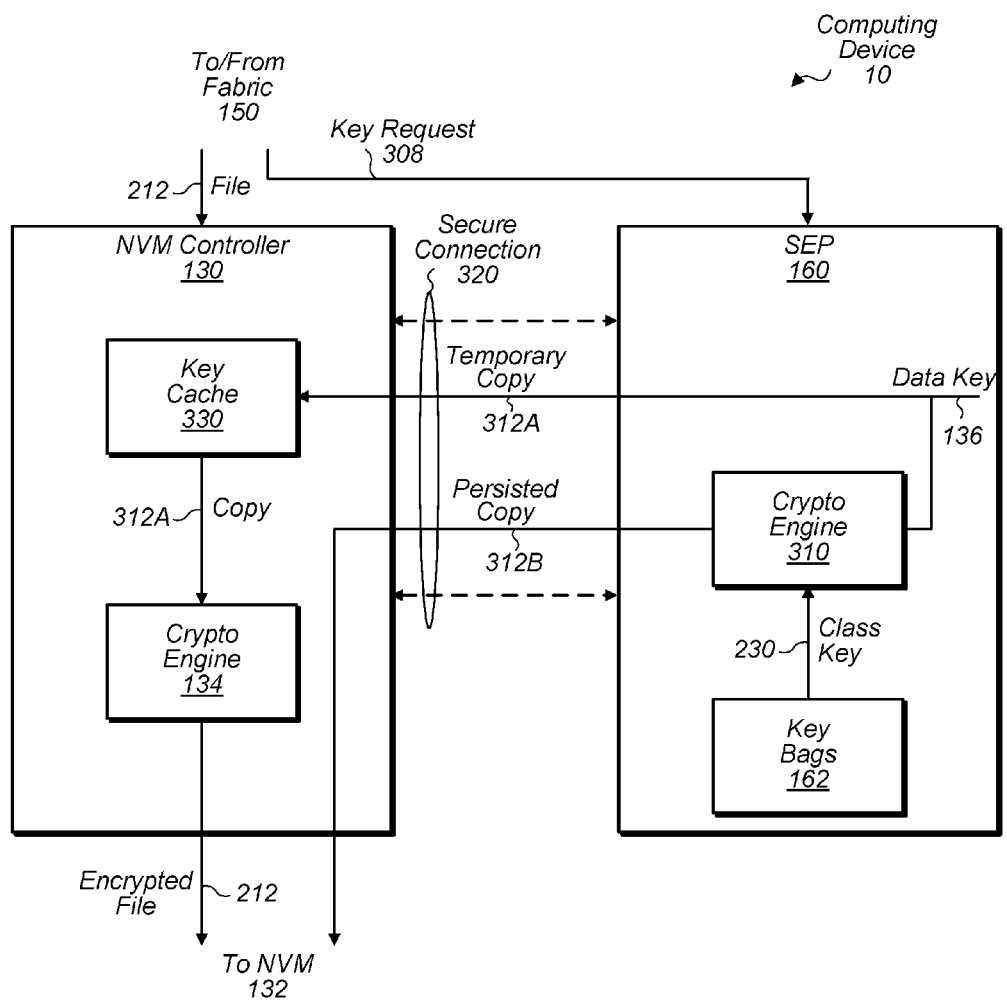
FIG. 3B is a block diagram illustrating an example of an interaction between a secure circuit and a memory controller during the write operation.

Turning now to FIG. 3B, a block diagram of an exchange between NVM controller 130 and SEP 160 during write operation 300 is depicted. In the illustrated embodiment, SEP 160 further includes a cryptographic engine 310, and NVM controller 130 includes a key cache 330.

Cryptographic engine 310, in one embodiment, is circuitry configured to perform cryptographic operations for SEP 160. As will be discussed below, these operations may include encryption and decryption of data keys 136 as well as the wrapping and unwrapping of key bags 162. Cryptographic engine 310 may implement any suitable encryption algorithm such as DES, AES, RSA, etc.

Key cache 330, in one embodiment, is a memory configured to store temporary copies of data keys 136 received from SEP 160. Cryptographic engine 134 may periodically retrieve keys 136 from cache 330 as needed. In some embodiments, cache 330 is configured to store a key 136 for a file 212 as long as that file is open. That is, once NVM controller 130 has received an instruction from processor 110 to close a file 212, cache 330 may discard the corresponding key 136.

As shown, a write operation may begin with SEP 160 receiving a key request 308 as discussed above with FIG. 3A. In response to response receiving this request, SEP 160 may either generate a new data key 136 or decrypt an existing data key 136 retrieved from NVM 132. If SEP 160 generates a new data key 136, SEP 160 sends two copies of the key to NVM controller 130 shown as temporary copy 312A and persisted copy 312B. In the illustrated embodiment, temporary copy 312A is stored in cache 330 and used by engine 134 to encrypt file 212. Persisted copy 312B is the copy that is encrypted with a class key 230 and stored in NVM 132 by NVM controller 130. As will be discussed with FIGS. 4A and 4B, this copy 312B may later be retrieved from NVM 132 during a read of the file 212.

As noted above and shown in FIG. 3B, SEP 160 may communicate copies 312 of data keys 136 with NVM controller 130 over a secure connection 320 established using a shared key between controller 130 and SEP 160. Although not shown, cryptographic engines 134 and 310 may perform encryption and decryption for secure connection 320.

Figure 4A:
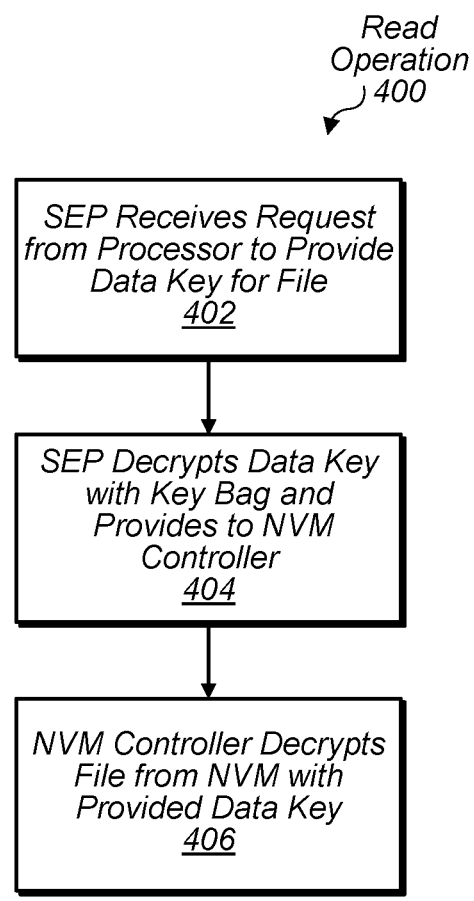
FIG. 4A is a flow diagram illustrating an example of a read operation from the non-volatile memory.

Turning now to FIG. 4A, a flow diagram of a read operation 400 is depicted. In various embodiments, computing device 10 performs read operation 400 when reading a file 212 from NVM 132.

In step 402, SEP 160 receives a request from processor 110 to provide a data key 136 for a file 212 being read by NVM controller 130. In various embodiments, an operating system executing on processor 110 may issue this request after receiving a corresponding request from an application. In some embodiments, this request may include an encrypted copy of the data key 136 (or an address where the key 136 is located).

In step 404, SEP 160 decrypts the requested data key 136 with the corresponding key bag 162 and provides the key 136 to NVM controller 130. In some embodiments, SEP 160 selects the appropriate decryption key 230 from a key bag 162 based on metadata stored with the data key 136.

In step 406, NVM controller 130 decrypts the requested file 212 using the provided key 136 from SEP. In some embodiments, step 406 may further include controller 130 functioning as a DMA controller to send the requested file 212 over fabric 150.

Figure 4B:
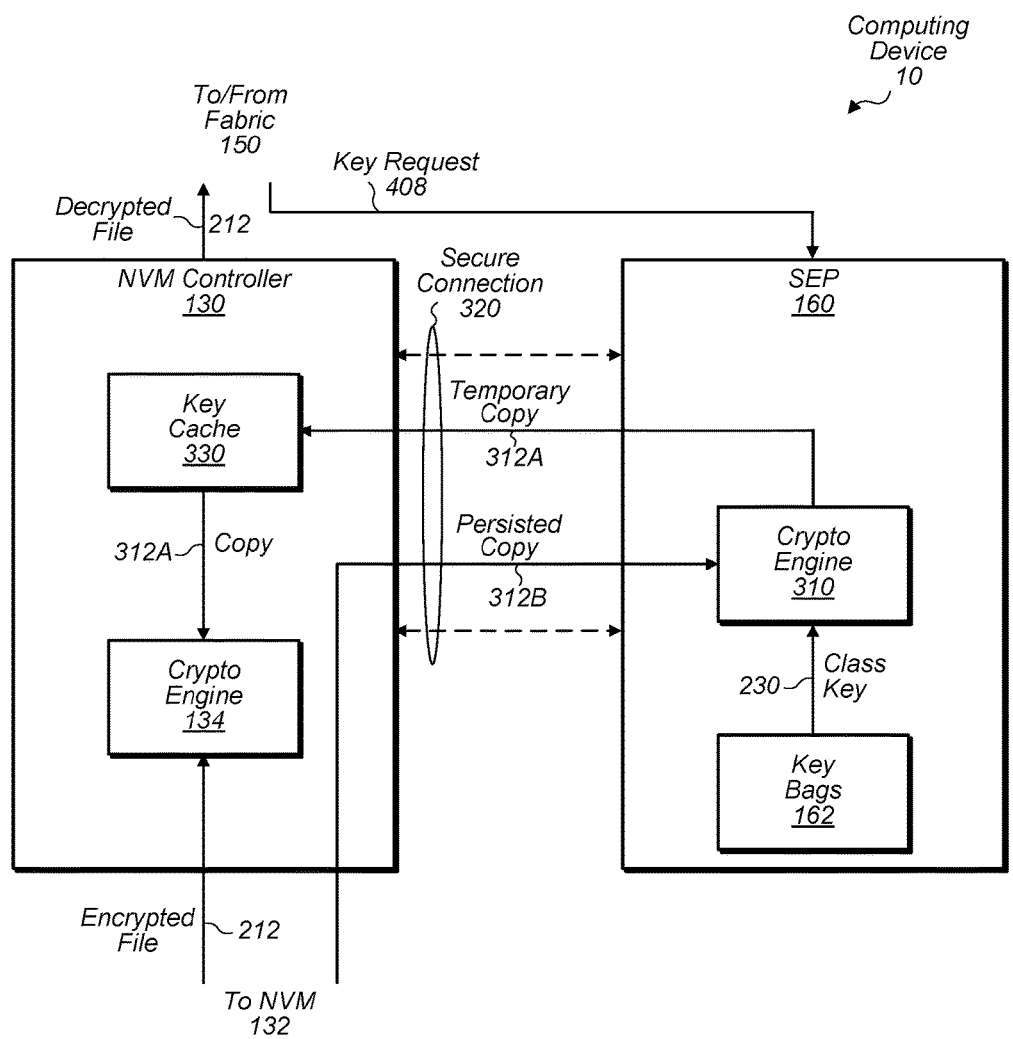
FIG. 4B is a block diagram illustrating an example of an interaction between the secure circuit and the memory controller during the read operation.

Turning now to FIG. 4B, a block diagram of an exchange between NVM controller 130 and SEP 160 during a read operation 400 is depicted. As shown, a read operation 400 may begin with SEP 160 receiving a key request 408. In response receiving this request, cryptographic engine 310 may select the appropriate class key 230 from the appropriate key bag 162 and decrypt the persisted copy 312B of the key 136 that was stored when the file 212 was previously written to NVM 132. SEP 160 may then send a temporary copy 312A of the decrypted key over secure connection 320 to NVM controller 130. NVM controller 130 may, in turn, store the copy 312A in cache 330 until needed by cryptographic engine 134 for decryption of the encrypted file 212 being read by controller 130 from NVM 132. Once decrypted, NVM controller 130 may send the decrypted file via fabric 150 to processor 110 (or one of peripherals 120 if it is the intended destination for the file 212).

Turning now to FIG. 5A, a flow diagram of an unwrap operation 500 for unwrapping (i.e., decrypting) a key bag is depicted. In various embodiments, computing device 10 performs unwrap operation 500 after a restart of computing device 10, after the active user of device 10 (e.g., the user currently logged into device 10) changes, or after a user has been inactive for a particular time period in order to begin using class keys 230 in a key bag 162.

In step 502, SEP 160 receives a wrapped key bag 162 and entropy supplied by a user to which the key bag 162 belongs. In some embodiments, the key bag 162 and entropy may be received in a request from processor 110 to load the key bag 162 for potential use. In other embodiments, step 502 may include SEP 160 retrieving the key bag 162 from NVM 132 and asking the user to supply the entropy for that bag. In some embodiments, the entropy includes a passcode comprising a sequence of alphanumeric characters. In other embodiments, the entropy may include information usable to derive a key such as biometric information collected from the user.

In step 504, SEP 160 derives the encryption key for key bag 162 based on the entropy supplied in step 502. In various embodiments, step 504 includes SEP 160 computing a key derivation function (KDF) with the entropy as an input to the function. As noted above, computing an encryption key may be based on user supplied entropy that cryptographically binds the key bag 162 to its owner—i.e., only a user with access to the entropy can gain to access to the key bag 162 being unwrapped. In some embodiments, SEP 160 also inputs a unique identity key into the KDF to derive the encryption key. In such an embodiment, the unique identity key is embedded in SEP 160 during fabrication of computing device 10 and is unique to device 10—i.e., two device 10s do not share the same identity key. SEP 160 also stores the unique identity key in a manner resistant to extraction. In doing so, a key bag 162 is cryptographically bound to a particular device 10—i.e., another device 10 would not be capable of deriving the correct encryption key as it does not include the correct unique identity key used to derive the encryption key.

In step 506, SEP 160 attempts to decrypt the key bag 162 with the derived key in step 504. If SEP 160 is successful in decrypting the key bag 162, SEP 160 may then store the key bag 162 in an internal memory accessible for servicing requests to decrypt data keys 136. If SEP 160 is unsuccessful, SEP 160 may indicate that the provided entropy may be incorrect and attempt to repeat operation 500.

Turning now to FIG. 5B, a flow diagram of a wrap operation 510 for wrapping (i.e., encrypting) a key bag is depicted. In various embodiments, computing device 10 may perform operation 510 in response to a new key bag 162 being generated for a particular user or class keys 230 being modified or added to an existing key bag 162. In step 512, SEP 160 receives entropy from a user such as a user's passcode. In some embodiments, this entropy may be provided by processor 110; in other embodiments, SEP 160 may receive the entropy in response to soliciting the user. In step 514, SEP 160 derives the encryption key for wrapping the key bag 162 based on the received entropy. In step 516, SEP 160 then encrypts the bag 162 with the derived key and instructs NVM controller 130 to write the bag to NVM 132.

Turning now to FIG. 5C, a flow diagram of a token operation 520 is depicted. In various embodiments, computing device 10 performs operation 500 in order to extend the use of a key bag 162 without asking the user to supply entropy again. Computing device 10 may perform steps 522 and 524 of token operation 520 after a user locks a touch screen of device 10 or has been inactive for some threshold period in order to protect an internal key bag 162 that has already been unwrapped. When a user later returns and attempts to gain access to device 10, computing device 10 may perform step 526 in order to obtain access to the key bag 162 without attempting to retrieve a key bag 162 from NVM 132 and unwrap it with user supplied entropy.

In step 522, SEP 160 generates a temporary encryption key and encrypts a user's key bag 162 with the temporary encryption key. At this point, SEP 160 may be unable to access the key bag 162 without use of the temporary key as SEP 160 may have already discarded the master key derived in step 504 and thus would be unable to unwrap any copy of the key bag 162 retrieved from NVM 132.

In step 524, SEP 160 sends a token that includes the temporary key to biosensor 170. Step 524 may also include SEP storing the encrypted key bag 126 in a local memory and discarding any copy of the temporary key—thus preventing the key bag 126 from being accessed without the key included in the token.

In step 526, SEP 160 receives the token from biosensor 170 and decrypts the temporarily encrypted key bag 162 with the encryption key included in the token. In various embodiments, SEP 160 may receive the token only after biosensor 170 has collected biometric information from the user and confirmed that it matches previously stored biometric information associated with the authorized owner of the key bag 162. If a match is not identified, biosensor 170 may permit one or more attempts before discarding the token. At which point, SEP 160 may need to perform unwrap operation 500 in order to obtain access to the key bag 162.

Figure 5D:
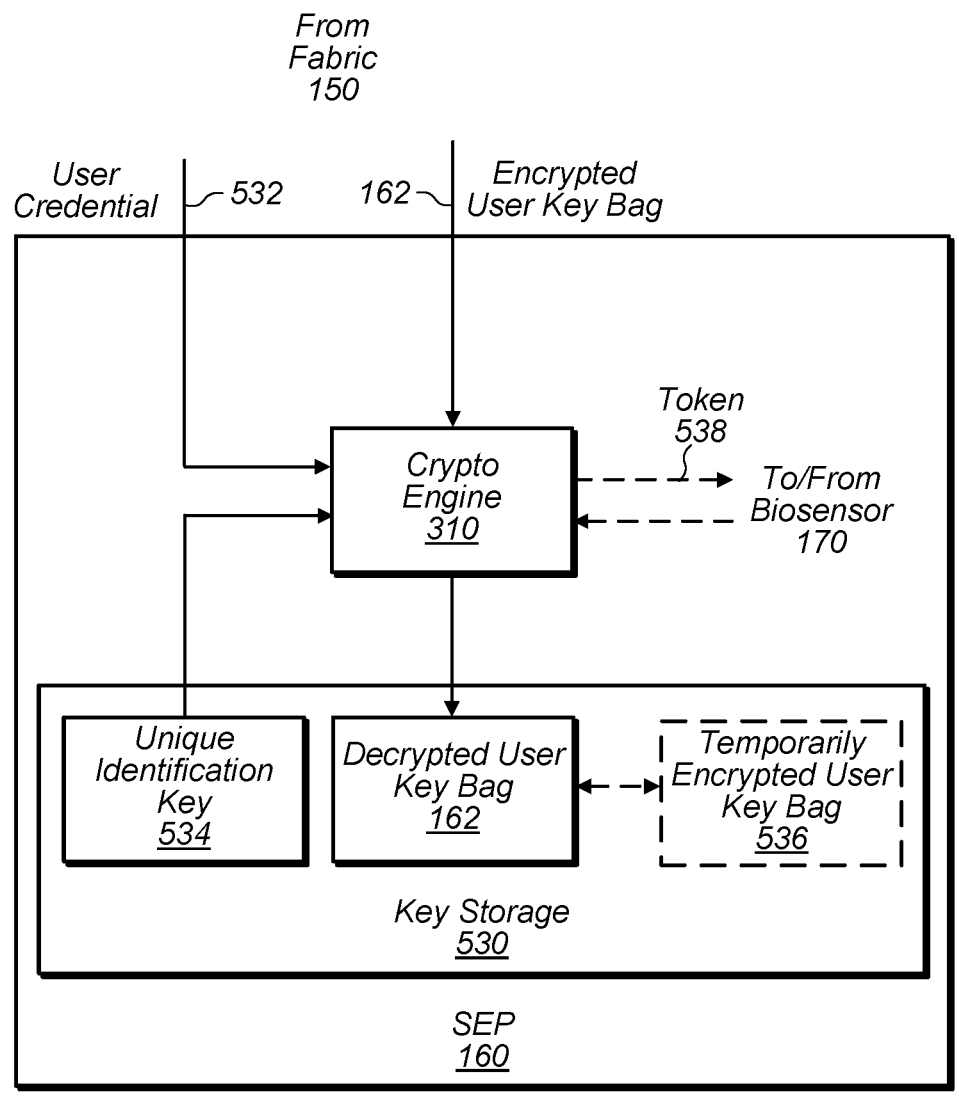
FIG. 5D is a block diagram illustrating an example of a secure circuit configured to perform the unwrap and wrap operations.

Turning now to FIG. 5D, a block diagram of SEP 160 during unwrapping a key bag 162 is depicted. In the illustrated embodiment, SEP 160 includes cryptographic engine 310 and key storage 530. In some embodiments, SEP 160 may be implemented differently than shown.

Key storage 530, in one embodiment, is a local memory (i.e., internal memory) configured to store key bags 162 and a unique identification key 534. In some embodiments, storage 530 may use different techniques for the storage of bags 162 and key 534. For example, in one embodiment, storage 530 includes a set of fuses that are burnt during a fabrication of SEP 160 (or more generally device 10) in order to record key 534. In such an embodiment, storage 530 may include random access memory (RAM) for storing key bags 162.

As shown, during an unwrap operation 500, SEP 160 may receive an encrypted user key bag 162 via fabric 150 after the key bag 162 is retrieved from NVM 132 by controller 130. SEP 160 may also receive a corresponding user credential 532 associated with the key bag 162. In response to receiving this information, cryptographic engine 310 may retrieve the unique identification key 534 from key storage 530 and compute a key derivation function with credential 532 and key 534 as inputs in order to derive the encryption key for decrypting the encrypted bag 162. If engine 310 is able to successfully decrypt the bag 162, engine 310 may place the decrypted user key bag 162 in key storage 530. As requests 308 and 408 are later received, engine 310 may retrieve class keys 230 from storage 530 in order to service those requests.

In the event that a user discontinues use of computing device 10 (e.g. the user locks the display of device 10 or is inactive for some period in some embodiments), crypto engine 310 may attempt to protect the key bag 162 by performing token operation 520 discussed above with respect to 5C and shown in FIG. 5D with respect to the dotted elements. As shown, engine 310 may attempt to temporarily encrypt the key bag 162 and store it in storage 530 as temporarily encrypted user key bag 536. In some embodiments, engine 310 generates a new encryption key for this encryption (as opposed to relying on the key derived from credential 532 and key 534). Engine 310 may include this new key in a token 538 that is sent over a secure connection to biosensor 170. If the user later attempts to gain access to device 10, the sensor 170 may confirm the user's biometric information and return the token 538. In response to receiving the token, engine 310 may decrypt key bag 536 with the key included in token 538 and restore the decrypted bag 162 to key storage 530 for future use.

Figure 6:
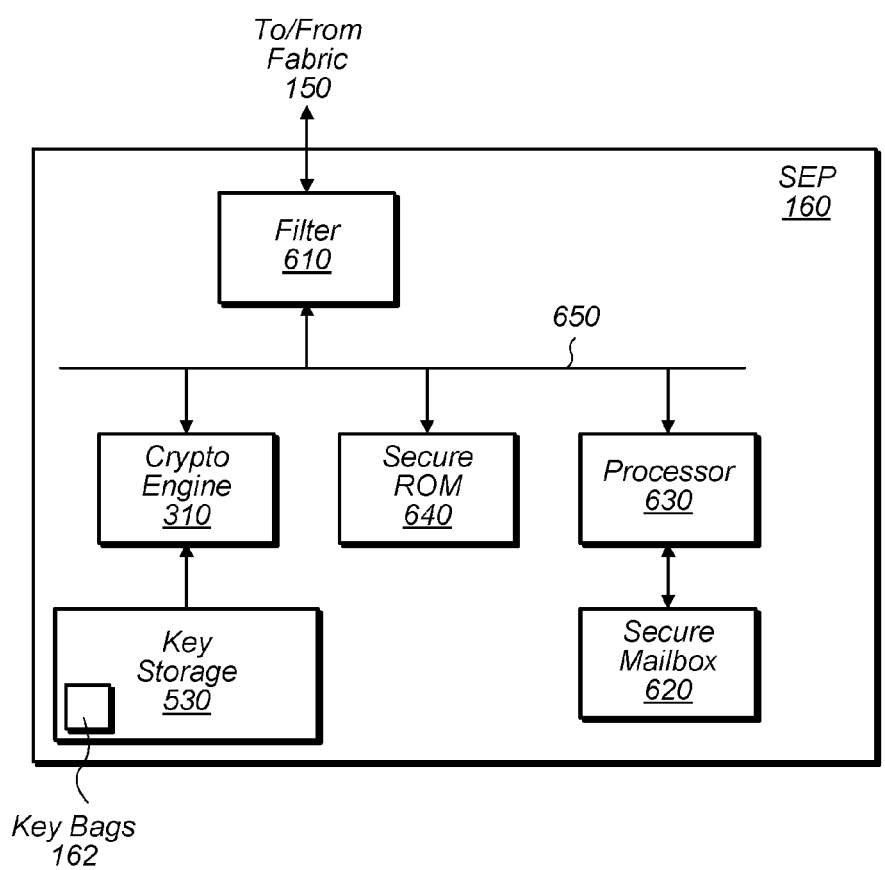
FIG. 6 is a block diagram illustrating an example of circuitry included in the secure circuit.

Turning now to FIG. 6, a block diagram of additional components in SEP 160 is depicted. In the illustrated embodiment, SEP 160 includes a filter 610, secure mailbox 620, processor 630, secure ROM 640, cryptographic engine 310, and key storage 530. In some embodiments, SEP 160 may include more (or less) components than shown in FIG. 6. As noted above, SEP 160 is a secure circuit that protects an internal, resource such as components 310, 530, 630, and 640. As discussed below, SEP 160 implements a secure circuit through the use of filter 610 and secure mailbox 620.

Filter 610, in one embodiment, is circuitry configured to tightly control access to SEP 160 to increase the isolation of the SEP 160 from the rest of the computing device 10, and thus the overall security of the device 10. More particularly, in one embodiment, filter 610 may permit read/write operations from the communication fabric 150 to enter SEP 160 only if the operations address the secure mailbox 620. Other operations may not progress from the fabric 150 into SEP 160. Even more particularly, filter 610 may permit write operations to the address assigned to the inbox portion of secure mailbox 620, and read operations to the address assigned to the outbox portion of the secure mailbox 620. All other read/write operations may be prevented/filtered by the filter 610. In some embodiments, filter 610 may respond to other read/write operations with an error. In one embodiment, filter 610 may sink write data associated with a filtered write operation without passing the write data on to local interconnect 650. In one embodiment, filter 610 may supply nonce data as read data for a filtered read operation. Nonce data (e.g., "garbage data") may generally be data that is not associated with the addressed resource within the SEP 160. Filter 610 may supply any data as nonce data (e.g. all zeros, all ones, random data from a random number generator, data programmed into filter 610 to respond as read data, the address of the read transaction, etc.).

In various embodiments, filter 610 may only filter incoming read/write operations. Thus, the components of the SEP 160 may have full access to the other components of computing device 10 including NVM 132 and RAM 142. Accordingly, filter 610 may not filter responses from fabric 150 that are provided in response to read/write operations issued by SEP 160.

Secure mailbox 620, in one embodiment, is circuitry that includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from the fabric 150 (e.g. issued by one of cores 112). The outbox may store write data from write operations sourced by processor 630 (which may be read by read operations sourced from fabric 150, e.g. read operations issued by processor 110). (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on processor 110 (or hardware such as peripherals 120) may request services of SEP 160 via an application programming interface (API) supported by an operating system of computing device 10—i.e., a requester may make API calls that request services of SEP 160. These calls may cause an operating system executing on processor 110 to write corresponding requests to mailbox mechanism 620, which are then retrieved from mailbox 620 and analyzed by processor 630 to determine whether it should service the requests. Accordingly, this API may be used to request the unwrapping of key bags 162 as well as the decryption of data keys 136 for NVM controller 130. By isolating SEP 160 in this manner, secrecy of maintained key bags 162 may be enhanced.

SEP processor 630, in one embodiment, is configured to process commands received from various sources in computing device 10 (e.g. from processor 110) and may use various secure peripherals to accomplish the commands. In the case of operations that involve key bags 162, SEP processor 630 may provide appropriate commands to cryptographic engine 310 in order to perform those operations. In various embodiments, SEP processor 630 may execute securely loaded software that facilitates implementing functionality descried with respect to SEP 160. This software may include encrypted program instructions loaded from a trusted zone in NVM 132 or secure ROM 640.

Secure ROM 640, in one embodiment, is a memory configured to program instruction for booting SEP 160. In some embodiments, ROM 640 may respond to only a specific address range assigned to secure ROM 640 on local interconnect 650. The address range may be hardwired, and processor 630 may be hardwired to fetch from the address range at boot in order to boot from secure ROM 640. Filter 610 may filter addresses within the address range assigned to secure ROM 640 (as mentioned above), preventing access to secure ROM 640 from components external to the SEP 160. In some embodiments, secure ROM 640 may include other software executed by SEP processor 630 during use. This software may include the program instructions to process inbox messages and generate outbox messages, code to interface to the cryptographic engine 310, etc.

Figure 7:
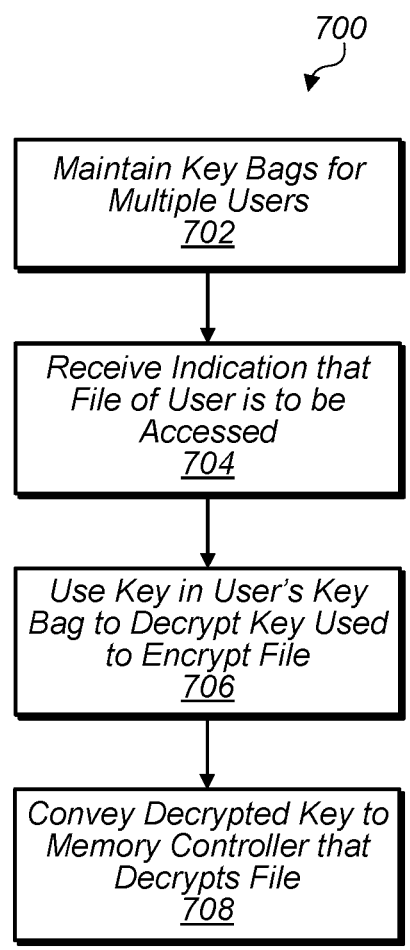
FIG. 7 is a flow diagram illustrating an example of a method performed by the computing device.

Turning now to FIG. 7, a flow diagram of a method 700 for implementing cryptographic isolation for multiple users is depicted. Method 700 is one embodiment of a method performed by a computing device such as computing device 10 in order to securely store information. Method 700 begins at step 720 in which a secure circuit (e.g., SEP 160) of the computing device maintains key bags for a plurality of users (e.g., key bags 162). Each key bag may be associated with a respective one of the plurality of users and includes a first set of keys (e.g., class keys 230) usable to decrypt a second set of encrypted keys (e.g., data keys 136) for decrypting data (e.g., user data 210) associated with the respective user. In step 704, the secure circuit receives an indication (e.g., a key request 408) that an encrypted file (e.g., a file 212) of a first of the plurality of users is to be accessed. In step 706, the secure circuit uses a key in a key bag associated with the first user to decrypt an encrypted key of the second set of encrypted keys. In step 708, the secure circuit conveys the decrypted key to a memory controller (e.g., NVM controller 130) configured to decrypt the encrypted file with the decrypted key in response to the memory controller retrieving the file from a memory (e.g., NVM 132).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
   a secure circuit configured to:
   maintain key bags for a plurality of users, wherein each key bag is associated with a respective one of the plurality of users and includes a first set of keys usable to decrypt a second set of encrypted keys for decrypting data associated with the respective user;
   receive, from a processor, an indication that an encrypted file of a first of the plurality of users is to be accessed;
   use a key in a key bag associated with the first user to decrypt an encrypted key of the second set of encrypted keys; and
   convey the decrypted key to a memory controller configured to decrypt the encrypted file with the decrypted key in response to the memory controller retrieving the file from a memory.

2. The computing device of claim 1, wherein the secure circuit is configured to cause the memory to store data of the first user in a manner that is cryptographically isolated from others of the plurality of users; and
   wherein the memory is a non-volatile memory.

3. The computing device of claim 1, wherein the secure circuit is configured to:
   prior to conveying the decrypted key, encrypt the decrypted key with a shared key known to the memory controller.

4. The computing device of claim 1, further comprising:
   the memory controller, wherein the memory controller is configured to:
   receive a request to write data of another file to the memory;
   encrypt the data with another encryption key of the second set; and store the other encryption key with the encrypted data in the memory.

5. The computing device of claim 4, wherein the memory controller is configured to store a respective encryption key of the second set for each file of the first user stored in the memory.

6. The computing device of claim 1, wherein the secure circuit is configured to:
encrypt the key bag associated with the first user with an encryption key derived from a credential supplied by the first user; and
send the encrypted key bag to the memory controller for storage in the memory.

7. The computing device of claim 6, wherein the credential is a passcode supplied by the first user.

8. The computing device of claim 6, wherein the secure circuit is configured to:
store a unique identifier indicative of the computing device; and
derive the encryption key used to encrypt the key based on the supplied credential and the stored unique identifier.

9. The computing device of claim 6, wherein the secure circuit is configured to:
retrieve the encrypted key bag from the memory in response to a restart of the computing device;
receive the credential from the first user; and
decrypt the encrypted key bag using an encryption key derived from the received credential.

10. The computing device of claim 1, further comprising:
a biosensor configured to collect biometric information from the first user; and
wherein the secure circuit is configured to decrypt the encrypted key of the second set in response to the collected biometric information matching biometric information of the first user.

11. The computing device of claim 1, wherein the secure circuit is configured to communicate with the memory controller via a mailbox mechanism configured to isolate a processor of the secure circuit from being accessed by circuitry external to the secure circuit.

12. A computing device, comprising:
a processor;
a memory controller configured to store encrypted data for a plurality of users in a memory such that data of a first of the plurality of users is cryptographically isolated from a second of the plurality of users; and
a secure circuit configured to:
maintain a plurality of key bags, wherein each key bag is a collection of keys associated with a respective one of the plurality of users and is usable, by the memory controller, to decrypt the encrypted data of the respective user;
derive, in response to a request from the processor, an encryption key for the key bag of the first user based on credential information supplied by the first user;
encrypt the key bag of the first user with the derived encryption key;
receive a request to decrypt an encrypted key used to encrypt a file of the first user;
decrypt the encrypted key with a key from the key bag of the first user; and
provide the decrypted key to the memory controller, wherein the memory controller is configured to decrypt the file with the provided key.

13. The computing device of claim 12, wherein the secure circuit is configured to send the encrypted key bag to the memory controller to cause the memory controller to store the encrypted key bag in the memory.

14. The computing device of claim 12, further comprising:
a biosensor configured to:
collect biometric information from a user of the computing device; and
provide a token to the secure circuit in response to the biometric information matching biometric information of the first user, wherein the secure circuit is configured to use the token to obtain the encryption key for the key bag of the first user.

15. The computing device of claim 12, wherein the secure circuit is isolated from access by the memory controller except through a mailbox mechanism included in the secure circuit.

16. A computing device, comprising:
a direct memory access (DMA) controller configured to communicate data associated with a plurality of users over a system bus and from a memory configured to store the data;
a processor configured to operate on the communicated data; and
a secure circuit configured to:
store a set of keys associated with a first of the plurality of users;
receive a request from the processor to decrypt an encryption key used to encrypt a file of the first user in the memory;
use a key in the set of keys to decrypt the encryption key used to encrypt the file; and
provide the decrypted encryption key to the DMA controller, wherein the DMA controller is configured to decrypt the file with the provided encryption key.

17. The computing device of claim 16, wherein the secure circuit is configured to:
encrypt the set of keys with an encryption key derived from a credential provided by the first user; and
request that the DMA controller provide the encrypted set of keys to a memory configured to store the encrypted set of keys.

18. The computing device of claim 17, further comprising:
a touch screen configured to:
receive a passcode from the first user; and
provide the passcode to the secure circuit as the credential.

19. The computing device of claim 16, wherein the secure circuit is isolated from access by the processor except through a mailbox mechanism accessible by an application programming interface (API).

* * * * *